United States Patent
Artic (10) Patent No.: US 11,941,996 B2
(45) Date of Patent: Mar. 26, 2024

(54) GRAPHICAL REPRESENTATION OF TAXIWAY STATUS

(71) Applicant: The Boeing Company, Chicago, IL (US)

(72) Inventor: Daniel Artic, Biebesheim (DE)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/653,808

(22) Filed: Mar. 7, 2022

(65) Prior Publication Data

US 2023/0282125 A1 Sep. 7, 2023

(51) Int. Cl.
*G08G 5/06* (2006.01)
*G08G 5/00* (2006.01)

(52) U.S. Cl.
CPC ........... *G08G 5/065* (2013.01); *G08G 5/0026* (2013.01)

(58) Field of Classification Search
CPC .............................. G08G 5/065; G08G 5/0026
See application file for complete search history.

(56) References Cited

U.S. PATENT DOCUMENTS

| | | | |
|---|---|---|---|
| 2008/0109160 A1* | 5/2008 | Sacle | G08G 5/0013 701/33.4 |
| 2010/0125403 A1 | 5/2010 | Clark et al. | |
| 2010/0332112 A1 | 12/2010 | Pschierer et al. | |
| 2014/0077975 A1 | 3/2014 | Khatwa et al. | |
| 2016/0217693 A1* | 7/2016 | Samuthirapandian | G08G 5/0039 |
| 2022/0005364 A1 | 1/2022 | Wang et al. | |
| 2023/0038694 A1* | 2/2023 | Foo | G08G 5/045 |

FOREIGN PATENT DOCUMENTS

EP 1930817 A1 6/2008

OTHER PUBLICATIONS

"Jeppesen Airport Moving Maps," Jeppesen: A Boeing Company, Available Online at https://ww2.jeppesen.com/wp-content/uploads/2019/02/airport-moving-maps-fact-sheet.pdf, Available as Early as Jan. 25, 2021, 2 pages.
European Patent Office, Extended European Search Report Issued in Application No. 23159256.9, dated Jul. 28, 2023, Germany, 10 pages.
Vernaleken, C. et al., "Considerations on symbology, data requirements and operational concept for integral NOTAM visualization on airport moving map displays," Proceedings of vol. 6957 SPIE Defense and Security Symposium, Mar. 16, 2008, Orlando, FL, 16 pages.

* cited by examiner

*Primary Examiner* — Joseph H Feild
*Assistant Examiner* — Sharmin Akhter
(74) *Attorney, Agent, or Firm* — Alleman Hall & Tuttle LLP (57) ABSTRACT

A computing device is provided comprising a processor and a memory storing instructions executable by the processor. The instructions are executable to query a database of aviation information extracted from one or more aviation information notices for information regarding a status of an airport. One or more query results are received indicating a status of a taxiway of the airport. The one or more query results are used to generate a map of the airport depicting the taxiway with a graphical representation that indicates the status of the taxiway.

20 Claims, 6 Drawing Sheets

GRAPHICAL REPRESENTATION OF TAXIWAY STATUS

BACKGROUND

Airport authorities occasionally close one or more taxiways at an airport. A taxiway closure is often communicated in an aviation information notice. In some examples, aviation information notices also include additional information, such as exceptions or conditions to a closure, classification codes, geographic tags, date stamps, and/or time stamps. In some instances, pilots and flight dispatchers review large numbers of such complex notices to plan and operate a flight.

SUMMARY

According to one aspect of the present disclosure, a computing device comprises a processor and a memory storing instructions executable by the processor. The instructions are executable to query a database of aviation information extracted from one or more aviation information notices for information regarding a status of an airport. One or more query results are received indicating a status of a taxiway of the airport. The one or more query results are used to generate a map of the airport depicting the taxiway with a graphical representation that indicates the status of the taxiway.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

The features, functions, and advantages that have been discussed can be achieved independently in various embodiments or can be combined in yet other embodiments, further details of which can be seen with reference to the following description and drawings.

DETAILED DESCRIPTION

In some instances, one or more taxiways at an airport are closed by airport authorities. A taxiway closure is often communicated in an aviation information notice, such as a Notice to Airmen (NOTAM). However, in some instances, aviation information notices also include additional information, such as exceptions or conditions to a closure, classification codes, geographic tags, date stamps, and/or time stamps. This information can also include specialized abbreviations, contractions, or other language specific to the aviation industry. In addition, the language and structure can be different between originating sources of a notice. For example, a NOTAM issued by the United States Federal Aviation Administration (FAA) can have different language and structure than a NOTAM issued by the European Organization for the Safety of Air Navigation (Eurocontrol).

As such, aviation information notices can be difficult to read and contextualize. Information provided in a notice, such as how and where an object is affected by a notice, object identification and geometry, can be difficult to understand, particularly during flight. Furthermore, in some instances, pilots and flight dispatchers review large numbers of such complex notices to plan and operate a flight.

To contextualize aviation operation information, such as a taxiway closure, end users reading an aviation information notice can refer to a map, such as a sectional chart or an airport diagram, and manually locate and/or annotate objects depicted in the map. However, this process can be time consuming, especially for commercial pilots and flight planners reviewing large numbers of notices for origin, destination, and alternate airports. In addition, complex aviation information notices are subject to being misinterpreted.

Some computing devices can curate and present aviation information notices using algorithms that analyze the notices and operational information contained therein. For example, a computing device can present an aviation information notice as a simplified or annotated text document, or by highlighting keywords such as the name of a closed taxiway on a map. However, it can be challenging for users to visualize the spatial extent of a taxiway closure presented in this manner, and to distinguish between different types of closures.

To address the above issues, examples are disclosed that relate to graphically depicting a status of a taxiway. Briefly, a database of aviation information extracted from one or more aviation information notices is queried for information regarding a status of an airport. One or more query results are received that indicate a status of a taxiway of the airport. The one or more query results are used to generate a map of the airport. The map depicts the taxiway with a graphical representation that indicates the status of the taxiway. The graphical representation allows the user to clearly visualize and differentiate between different types of taxiway closures. Furthermore, the map allows the user to view and contextualize the status of a taxiway on any of a plurality of devices having a variety of form factors, such as a tablet computing device or an aircraft cockpit display.

Figure 1:
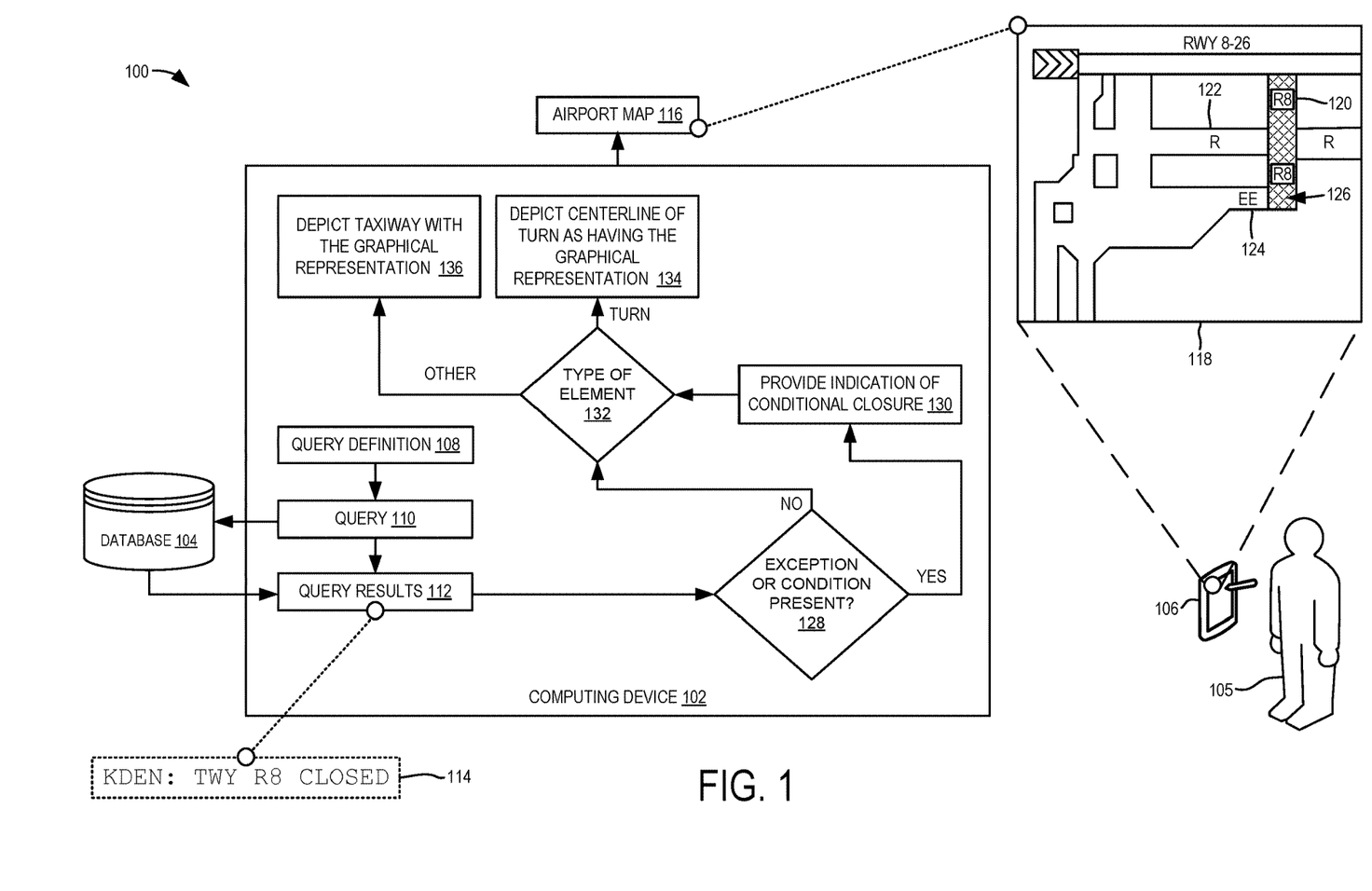
FIG. 1 shows a block diagram of an example system for graphically depicting a status of a taxiway for an airport.

FIG. 1 shows an example of a system 100 for graphically depicting a status of a taxiway for an airport. The system 100 includes a computing device 102. The computing device 102 comprises a processor and a memory storing instructions executable by the processor. The instructions are executable to implement the methods and processes described herein. Additional aspects of the computing device 102 are described in more detail below with reference to FIG. 8.

In some examples, the computing device 102 comprises a desktop computing device, a laptop computing device, or a tablet computing device. In other examples, the computing device 102 comprises a server computing device. For example, aspects of the methods and processes described herein can be implemented at a server computing device executing a web application that is operated by an end user 105 (e.g., a pilot or flight dispatcher) via a user computing device such as tablet computing device 106.

The computing device 102 is configured to query a database 104 of aviation information extracted from one or more aviation information publications for information regarding a status of an airport. In some examples, the database 104 comprises information extracted from a NOTAM. In this manner, the database 104 serves as a repository of information describing the status of one or more components of an airspace system (e.g., an airspace region, a navigation facility, or an airport).

In some examples, the database 104 is located at the computing device 102. In other examples, the database 104 is located at another computing device. For example, the database 104 may be stored and maintained on a server computing device located at a remote datacenter, while the computing device 102 comprises a user's workstation or a different server device. In this manner, the tasks of updating and maintaining the database 104 are offloaded from the computing device 102.

To execute a query on the database 104, the computing device 102 is configured to receive a query definition 108. In some examples, the query definition 108 is received from another computing device, such as the tablet computing device 106. For example, the tablet computing device 106 may be utilized to query the database 104 for NOTAMs that affect an upcoming or current flight. To prepare the briefing, the user 105 queries the database 104 for the status of a departure airport, an arrival airport, or an alternate airport for the flight.

The computing device 102 is further configured to receive one or more query results 112 for the query 110. In this manner, the computing device 102 is configured to receive information derived from the one or more aviation information publications.

In some examples, the one or more query results indicate a status of a taxiway of the airport. It will be appreciated that, while the following methods and processes are described with reference to a taxiway, the methods and processes disclosed herein are additionally or alternatively applicable to any other suitable object. Some other examples of suitable objects include, but are not limited to, a runway, a roadway, a ramp, an apron, a terminal, an airspace area, a navigation facility and a waypoint.

FIG. 1 shows an example of a query result 114 (KDEN: TWY R8 CLOSED) received in response to a query for aviation information notices in effect at Denver International Airport. The result 114 comprises a summarized description of a raw aviation information notice (e.g., a NOTAM) indicating that taxiway R8 is closed. Advantageously, the one or more query results 112 may exclude additional information that may lead to the full aviation information notice to be misinterpreted or disregarded. In addition, a summarized description of a raw aviation information notice may occupy less memory than a full notice and may be faster to process when generating the airport map 116.

It will also be appreciated that, in other examples, the query results additionally or alternatively include any other suitable information output in response to the query. Another example of a suitable query result is a null result, indicating that the query 110 does not match any entries in the database 104. In yet other examples, a query result includes a full aviation information notice matching the query 110. In this manner, an end user can refer to the full notice for clarification or to confirm that a summary or a graphical representation of the information contained therein is accurate.

In some examples, the status of the taxiway is indicated by a code or a keyword. For example, the result 114 includes the keyword "CLOSED" that indicates that the taxiway is closed. As described above, the keyword "CLOSED" is included in the example query result 114. Other examples of suitable keywords include, but are not limited to, "CLSD", "FORBIDDEN", "NOT AVAILABLE", and "NOT PERMITTED". An example of a code that indicates the status of the taxiway is an International NOTAM ("Q") code. For example, a Q-code of "QMXLC" indicates that a taxiway is closed. In such examples, the computing device 102 translates the code (e.g., using a lookup table) to thereby determine the status. In this manner, the system 100 can determine the status of the taxiway.

In other examples, the code or keyword does not appear in the one or more query results 112. For example, the code or keyword can be provided in the query definition 108, and the query results 112 merely indicate any taxiway that matches the code or keyword. Accordingly, and in one potential advantage of the present disclosure, the query results that match the status provided in the query definition 108 exclude potentially redundant information.

In some examples, the query 110 is a broad query which returns any query results 112 that directly match the given code or keyword, and any results that match similar keywords. For example, a broad query for "CLOSED" returns a list of taxiways that are labeled with "CLOSED" in the database 104, as well as taxiways labeled with similar keywords, such as "CLSD" and "NOT AVAILABLE". In this manner, the query results include direct matches and indirect matches that are also potentially relevant to the query.

The one or more query results 112 are used to generate a map of the airport 116. In some examples, the map 116 comprises an airport diagram overlaid with geographic information system (GIS) data received from an aerodrome mapping database (AMDB). FIG. 1 shows an example map 118 depicting a portion of Denver International Airport. The example map 118 also includes geospatial data indicating positions of airport assets, including taxiways R8 120, taxiway R 122 and taxiway EE 124. The geospatial data allows status information contained in the one or more query results to be localized on the map.

The map 116 depicts the taxiway with a graphical representation that indicates the status of the taxiway. As described in more detail below with reference to FIGS. 2-6, the graphical representation 126 provides a clear visual representation of the status of the taxiway, thereby enabling an end user (e.g., a pilot, a flight dispatcher, or an air traffic controller) to understand and contextualize the status of the taxiway.

In some examples, the map 116 is output to a local memory or processor on the computing device 102. In other examples, the enriched aviation information notice is output to another device, such as a workstation computing device or an electronic flight bag. For example, the map 116 can be displayed on the tablet 106 or an aircraft cockpit display. In this manner, the map 116 can be viewed and navigated on any of a plurality of devices having a variety of form factors, thereby increasing an end user's situational awareness regarding the airport.

As introduced above, in some examples, the status comprises a closure. For example, the query result 114 indicates that taxiway "R8" 120 is closed. Accordingly, the graphical representation represents at least a portion of the taxiway subject to the closure. For example, the graphical representation 126 comprises a textured box overlaid on taxiway "R8" 120 in the example map 118 to indicate that taxiway R8 is closed.

Figure 2:
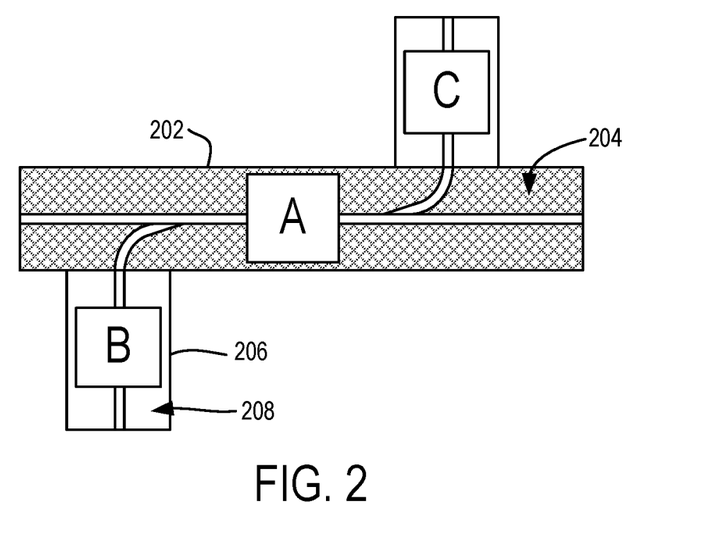
FIG. 2 shows an example of a graphical representation that indicates the status of the taxiway of FIG. 1.

FIG. 2 shows another example of a closed taxiway "A" 202. The taxiway 202 is depicted with a graphical representation 204 that identifies the taxiway 202 as closed. The graphical representation 204 comprises one or more of a different color, a different opacity, or a different texture than another portion of the map. For example, a second taxiway "B" 206 is not closed and has a different graphical representation 208 than the closed taxiway 202. The different graphical representations allow a user to rapidly visualize the status of the taxiway.

In some examples, the closed taxiway 202 is depicted in red, and the graphical representation 208 of the open taxiway 206 is a default graphical representation of the taxiway 206 (e.g., a rectangle with a white fill color). Some users perceive differences in color faster than differences between similarly colored patterns. In addition, some colors have preexisting connotations which augment the information conveyed in the graphical representation 204. For example, red is often associated with stop signs and closure signs. Accordingly, and in one potential advantage of the present disclosure, depicting the graphical representation with a different color than another portion of the map allows a user to visualize and contextualize the status of the taxiway.

In other examples, the closed taxiway 202 is at least partially transparent, and one or more other portions of the map (e.g., the open taxiway 206) are depicted with a default opacity (e.g., 100% opaque). In this manner, the taxiway 202 appears unavailable to a user. In addition the opacity of the one or more other portions of the map emphasizes other information on the map, such as taxiways, runways, and other airport facilities that are open.

In yet other examples, the graphical representation 204 of the closed taxiway 202 comprises a fill texture (e.g., hash marks) that is different than the default graphical representation of the open taxiway 206. Accordingly, and in one potential advantage of the present disclosure, contrast between the graphical representation and other portions of the map is clear in low-light conditions, under colored light illumination (e.g., red-colored night illumination in an aircraft cockpit), and when color is not available at an output device (e.g., a black-and-white printer).

Figure 3:
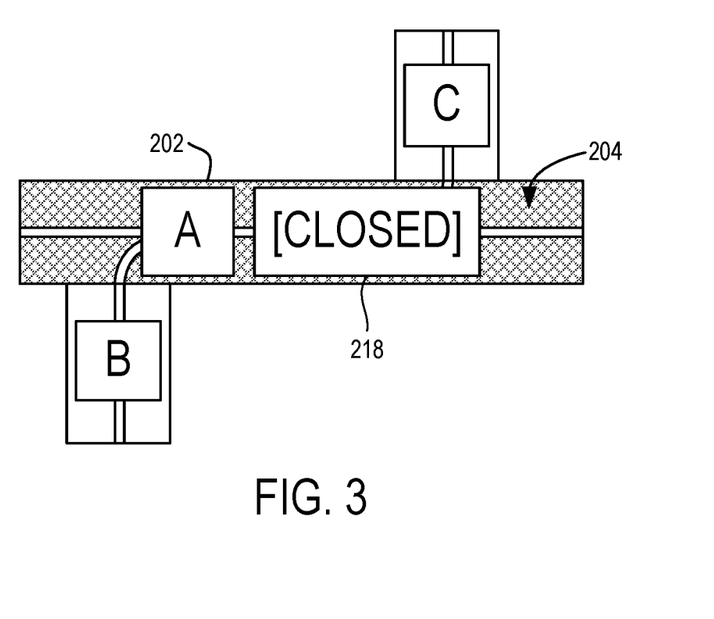
FIG. 3 shows another example of a graphical representation that indicates the status of the taxiway of FIG. 1.

FIG. 3 shows another example of a graphical representation for the closed taxiway 202. The graphical representation comprises a text label 218 (e.g., "CLOSED"). In some examples, the text label 218 is provided in addition to the graphical representation 204 of FIG. 2. In other examples, the text label 218 is an alternative to the graphical representation 204. By providing the text label 218, the graphical representation unambiguously shows that the taxiway 202 is closed.

Figure 4:
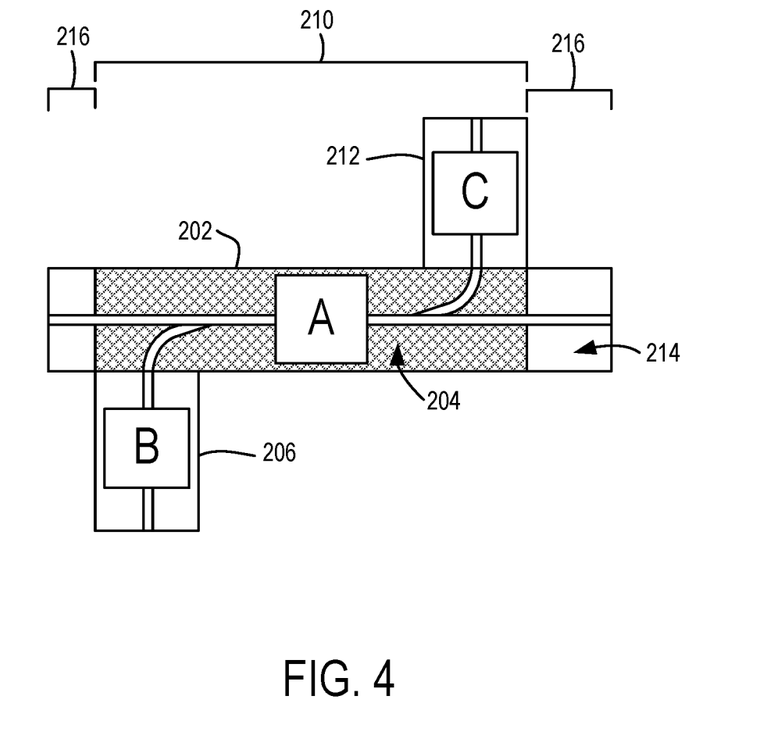
FIG. 4 shows yet another example of a graphical representation that indicates the status of the taxiway of FIG. 1.

In some examples, the status comprises a partial closure. For example, and as shown in FIG. 4, a portion 210 of the taxiway "A" 202 is closed between taxiway "B" 206 and taxiway "C" 212. Accordingly, the taxiway 202 is displayed with the graphical representation 204 that identifies the closed portion 210 of the taxiway 202. The taxiway 202 further comprises a second, different graphical representation 214 that indicates a portion 216 of the taxiway that is not closed. In some examples, graphical representation 214 is analogous to the graphical representation 208 of FIG. 2. In this manner, a user can visually identify the open and closed portions of the taxiway.

In some examples, the status comprises a conditional closure. For example, a taxiway may be closed to heavy aircraft, but open to smaller aircraft. In other examples, the taxiway is closed to all aircraft except those given special clearance by air traffic control. Some other examples of conditions or exceptions to a closure are related to wingspan, aircraft category (e.g., single engine, multi-engine, military, or civilian), aircraft type, wheelbase width, weight, and/or mission (e.g., rescue, combat, cargo, or passenger transport). In some examples, a closure is additionally or alternatively suspended at predetermined times (e.g., based on a schedule) and/or on demand by a pilot (e.g., "closed—prior clearance required"). One example of a conditional closure appears in an aviation information notice as the text "TWY A BETWEEN TWY E AND TWY F, TAXIING LIMITED TO ACFT WITH MAX WINGSPAN OF 41M." In this example, the taxiway is closed to aircraft with a wingspan of greater than 41 meters. Aircraft with a wingspan of 41 m or less may be allowed to taxi on the portion of the taxiway affected by the conditional closure. An example of a closure with exceptions appears in an aviation information notice as the text "TWY H CLOSED EXC CLEARANCE FROM ATC". In this example, air traffic control may grant exceptions for some aircraft to use taxiway H.

Accordingly, and with reference again to FIG. 1, the computing device 102 is configured to determine if an exception or condition is present, as indicated at 128. When an exception or condition is present at 128, the computing device 102 is configured to provide an indication of a conditional closure, as indicated at 130. In this manner, a user is informed if there is an exception or condition, allowing the user to conduct further research and plan accordingly.

Figure 5:
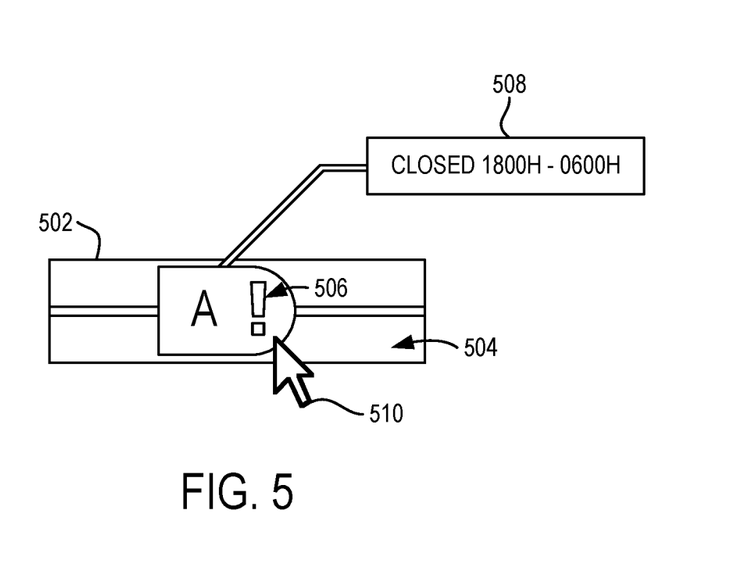
FIG. 5 shows another example of a graphical representation that indicates the status of the taxiway of FIG. 1.

FIG. 5 shows an example of a taxiway 502 that is subject to a conditional closure. The taxiway 502 is depicted by a graphical representation 504 that comprises an indication of a conditional closure. The indication of the conditional closure comprises an exclamation point icon 506. In this manner, the graphical representation 504 visually communicates to a user that the status of the taxiway 502 is subject to conditions and/or exceptions.

In some examples, the graphical representation 504 additionally or alternatively includes information on the conditional closure. For example, as shown in FIG. 5, a text box 508 is displayed that describes the conditions of the taxiway closure (e.g., "CLOSED 1800H-0600H"). In this manner, the graphical representation of the taxiway provides a detailed explanation of the conditional closure.

In other examples, the indication of the conditional closure comprises an interactive control selectable to cause display of information on the conditional closure. In the example of FIG. 5, the exclamation point icon 506 is user-selectable via a cursor 510. User selection of the exclamation point icon 506 causes display of the text box 508, which is otherwise not displayed. By linking display of the text box to the user selection of the icon, the additional information on the conditional closure is hidden until the user is ready to view it, preventing the display of potentially extraneous information and providing the user with an unobstructed view of the airport map.

The text box 508 shows that the taxiway 502 is subject to a scheduled closure. In some examples, the scheduled closure is indicated by providing the text box and the exclamation point icon 506. The schedule is not applied to depict a current status of the taxiway. Accordingly, and in one potential advantage of the present disclosure, users are made aware that the closure is conditional, allowing the users to determine the conditions that apply to their specific missions. For example, at 2300*h* local time, the taxiway 502 is closed. If the taxiway 502 were depicted in the same manner as an unconditional closure, a pilot may assume that the taxiway 502 is always closed. However, the taxiway 502 may be open later (e.g., 0700*h* local time) when the pilot arrives.

It will also be appreciated that, in other examples, the schedule is used to depict the taxiway 502 with a graphical representation that corresponds to a status of the taxiway 502 at a determined time (e.g., a current time, a user-input time, or a calculated time). In this manner, the graphical representation allows users to visualize the status of the taxiway at the determined time.

With reference again to FIG. 1, in some examples, the computing device 102 is further configured to determine a type of element described by the query results 112. For example, a turn from one taxiway onto another taxiway may be closed, while the taxiways themselves are open.

When the affected taxiway element comprises a turn, the computing device 102 is configured to depict a centerline of the turn as having the graphical representation that indicates the status, as indicated at 134. In other examples, when the affected taxiway element comprises another taxiway element (e.g., straightaway or a turnaround area), the computing device 102 is configured to depict the taxiway with the graphical representation that indicates the status of the affected taxiway element, as indicated at 136. In this manner, the map clearly indicates the status of various taxiway elements.

Figure 6:
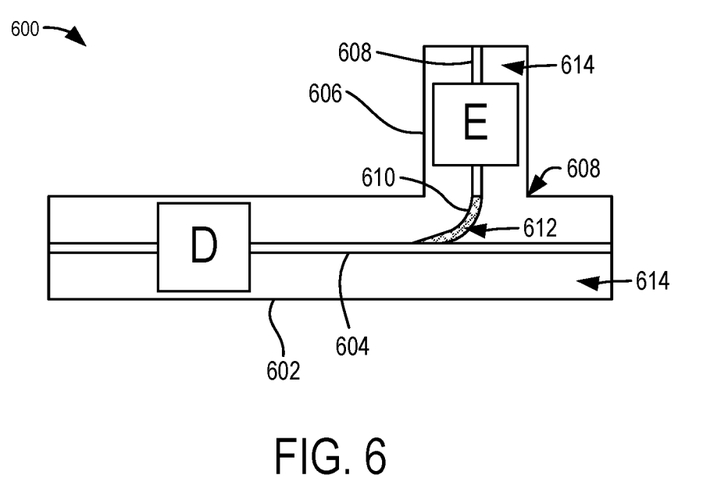
FIG. 6 shows yet another example of a graphical representation that indicates the status of the taxiway of FIG. 1.

For example, FIG. 6 shows a first taxiway "D" 602 having a first centerline 604 and a second taxiway "E" 606 having a second centerline 608. The first taxiway "D" 602 and the second taxiway "E" 606 intersect such that aircraft can turn from one taxiway onto the other. A third centerline 610 marks the turn between the first taxiway "D" 602 and the second taxiway "E" 606.

In the example of FIG. 6, the turn 608 is closed. Accordingly, the centerline 610 of the turn is depicted with a graphical representation 612 that indicates that the turn is closed. In some examples, the graphical representation 612 is analogous to the graphical representation 204 of the closed taxiway 202 in FIG. 2. For example, the centerline 610 may be colored red to indicate that the turn 608 is closed. In this manner, the map 600 clearly indicates the status of the turn 608.

In contrast to the turn 608, the taxiways 602 and 606 are open. Accordingly, the open taxiways 602 and 606 are depicted with a different graphical representation 614. In some examples, the graphical representation 614 is analogous to the graphical representation 208 of the open taxiway 206 in FIG. 2. For example, the graphical representation 614 may be the default graphical representation of the taxiways 602 and 606. In this manner, the map 600 also clearly indicates the status of the taxiways connected by the turn. Thus, the map allows a user to visualize and contextualize the status of taxiway elements at an airport, increasing the user's situational awareness and streamlining the process of reviewing operational information contained in aviation information notices.

Figure 7:
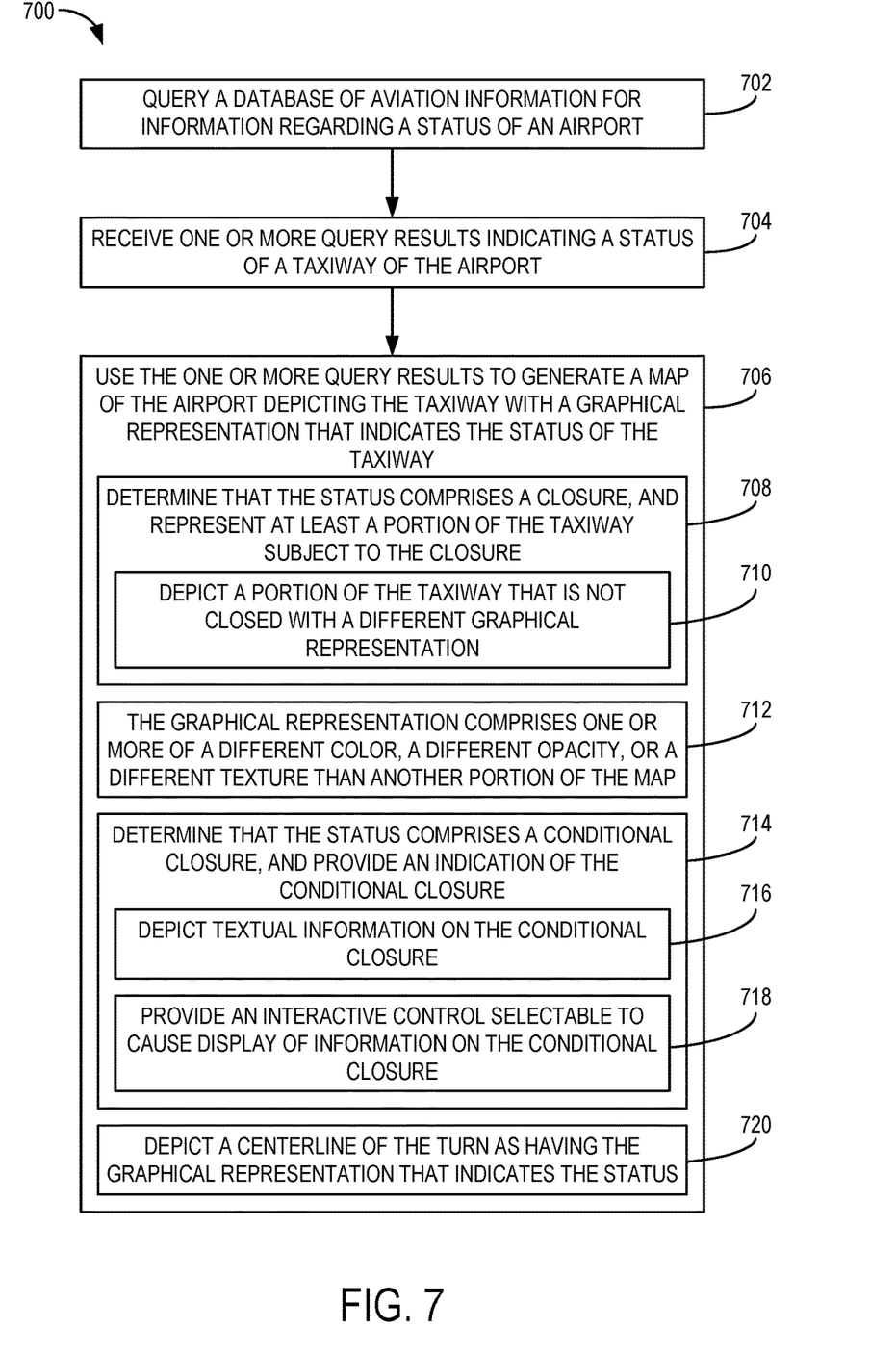
FIG. 7 shows a show a block diagram of an example method for graphically depicting a status of a taxiway for an airport.

FIG. 7 shows a flow diagram depicting an example method 700 for generating an enriched aviation information notice. The following description of method 700 is provided with reference to the components described herein and shown in FIGS. 1-6 and 8. In some examples, the method 700 is performed at the computing device 102 of FIG. 1 or the tablet 106 of FIG. 1. In other examples, the method 700 is performed in other contexts using other suitable components.

At 702, the method 700 comprises querying a database of aviation information for information regarding a status of an airport. For example, the computing device 102 of FIG. 1 is configured to query the database 104. In this manner, the computing device 102 can access information extracted from one or more aviation information publications describing the status of one or more components of an airspace system (e.g., an airspace region, a navigation facility, or an airport).

At 704, the method 700 comprises receiving one or more query results indicating a status of a taxiway of the airport. For example, the computing device 102 of FIG. 1 is configured to receive the one or more query results 112. In this manner, the computing device receives information stored in the database 104 that is relevant to the query.

At 706, the method 700 comprises using the one or more query results to generate a map of the airport depicting the taxiway with a graphical representation that indicates the status of the taxiway. For example, the one or more query results 112 are used to generate the airport map 116 of FIG. 1. The map provides a clear visual representation of the status of the taxiway, thereby enabling users to view and contextualize the status of the taxiway.

In some examples, at 708, the method 700 comprises determining that the status comprises a closure, and depicting the taxiway comprises representing at least a portion of the taxiway subject to the closure. For example, the taxiway 202 of FIG. 2 is depicted with a graphical representation 204 that identifies the taxiway 202 as closed. In this manner, the graphical representation 204 clearly shows that the taxiway is closed.

At 710, in some examples, the status comprises a partial closure, and generating the map further comprises depicting a portion of the taxiway that is not closed with a different graphical representation. For example, the graphical representation 204 of FIG. 4 indicates a portion of the taxiway 202 that is closed, and the graphical representation 214 of FIG. 4 represents a portion of the taxiway 202 that is not closed. In this manner, a user can rapidly identify the open and closed portions of the taxiway.

In some examples, at 712, the graphical representation comprises one or more of a different color, a different opacity, or a different texture than another portion of the map. For example, the graphical representation 204 of the closed taxiway 202 of FIG. 2 has a different color, a different opacity, or a different texture than the graphical representation 208 of the open taxiway 206. In this manner, a user can rapidly distinguish the taxiway and its corresponding status from another portion of the map.

At 714, in some examples, the method 700 includes determining that the status comprises a conditional closure, and depicting the taxiway comprises providing an indication of the conditional closure. For example, the exclamation point icon 506 of FIG. 5 serves as an indication that the taxiway 502 is subject to a conditional closure. In this manner, the graphical representation 504 communicates to a user that there is a conditional closure affecting the taxiway 502.

In some examples, at 716, providing the indication of the conditional closure further comprises depicting textual information on the conditional closure. For example, as shown in FIG. 5, a text box 508 is displayed that describes the conditions of the taxiway closure. In this manner, the graphical representation of the taxiway provides a detailed explanation of the conditional closure.

At 718, in some examples, providing the indication of the conditional closure comprises providing an interactive control selectable to cause display of information on the conditional closure. For example, the exclamation point icon 506 of FIG. 5 is user-selectable via a cursor 510 to cause display of the text box 508. By linking display of the text box to the user selection of the icon, the additional information on the conditional closure is hidden until the user is ready to view it, preventing the display of potentially extraneous information and providing the user with an unobstructed view of the airport map.

In some examples, at 720, the taxiway comprises a turn, and a centerline of the turn is depicted as having the graphical representation that indicates the status. For example, the centerline 610 of the turn 608 of FIG. 6 is depicted with a graphical representation 612 that indicates that the turn is closed. In this manner, the map clearly indicates the status of the turn.

In some embodiments, the examples described herein can be tied to a computing system of one or more computing devices. In particular, aspects of such methods and processes can be implemented as a computer-application program or service, an application-programming interface (API), a library, and/or other computer-program product.

Figure 8:
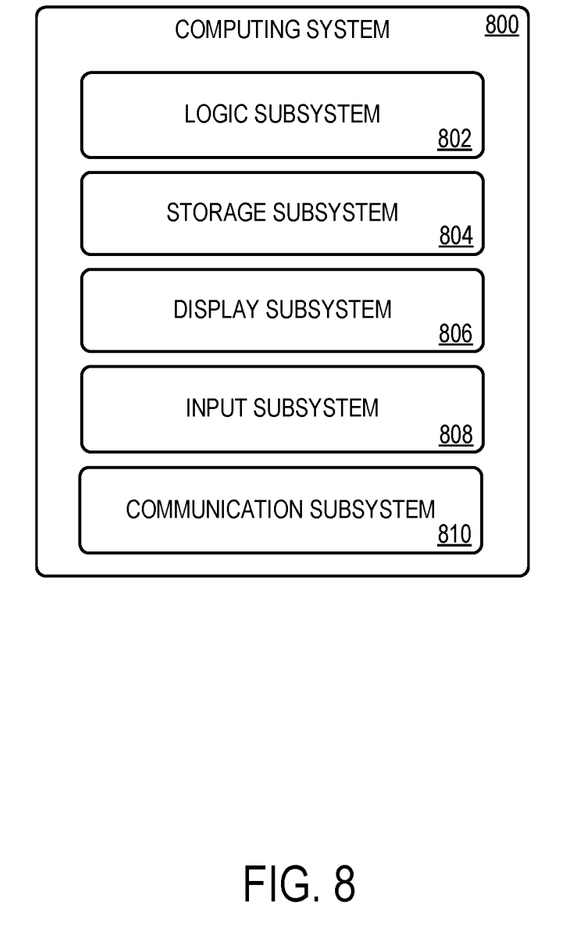
FIG. 8 shows a block diagram of an example computing system.

FIG. 8 schematically shows a non-limiting embodiment of a computing system 800 that can enact one or more of the examples described above. For example, computing system 800 can be used to execute instructions to perform the method 700 of FIG. 7 and/or potentially perform other functions.

Computing system 800 is shown in simplified form. Computing system 800 can take the form of one or more personal computers, server computers, tablet computers, network computing devices, mobile computing devices, mobile communication devices (e.g., smart phone), and/or other computing devices. In some examples, the computing device 102 of FIG. 1 and/or the tablet computing device 106 of FIG. 1 comprise one or more aspects of the computing system 800.

Computing system 800 includes a logic subsystem 802, a storage subsystem 804, and a display subsystem 806. Computing system 800 can optionally include an input subsystem 808, a communication subsystem 810, and/or other components not shown in FIG. 8.

Logic subsystem 802 includes one or more physical devices configured to execute instructions. For example, logic subsystem 802 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 802 can be used to execute instructions to perform the method 700 of FIG. 7.

Logic subsystem 802 can include one or more processors configured to execute software instructions. Additionally or alternatively, logic subsystem 802 can include one or more hardware or firmware logic machines configured to execute hardware or firmware instructions. Processors of logic subsystem 802 can be single-core or multi-core, and the instructions executed thereon can be configured for sequential, parallel, and/or distributed processing. Individual components of logic subsystem 802 optionally can be distributed among two or more separate devices, which can be remotely located and/or configured for coordinated processing. Aspects of logic subsystem 802 can be virtualized and executed by remotely accessible, networked computing devices configured in a cloud-computing configuration.

Storage subsystem 804 includes one or more physical devices configured to hold instructions executable by logic subsystem 802 to implement the methods and processes described herein. For example, storage subsystem 804 can hold instructions executable to perform the method 700 of FIG. 7 and/or potentially perform other functions. When such methods and processes are implemented, the state of storage subsystem 804 can be transformed—e.g., to hold different data.

Storage subsystem 804 can include removable and/or built-in devices. Storage subsystem 804 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 can include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 806 can be used to present a visual representation of data held by storage subsystem 804. This visual representation can take the form of a graphic user interface (GUI). As the herein described methods and processes change the data held by the storage subsystem 804, and thus transform the state of the storage machine, the state of display subsystem 806 can likewise be transformed to visually represent changes in the underlying data. For example, display subsystem 806 can be configured to display the airport map 116 of FIG. 1.

Display subsystem 806 can include one or more display devices utilizing virtually any type of technology. Such display devices can be combined with logic subsystem 802 and/or storage subsystem 804 in a shared enclosure, or such display devices can be peripheral display devices.

When included, input subsystem 808 can comprise or interface with one or more user-input devices such as a keyboard, mouse, touch screen, or joystick. In some embodiments, the input subsystem 808 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 808 can be configured to receive user inputs while performing the method 700, and/or displaying the airport map 116.

When included, communication subsystem 810 can be configured to communicatively couple computing system 800 with one or more other computing devices. Communication subsystem 810 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 810 can allow computing system 800 to send and/or receive messages (e.g., the query 110, the query results 112, and the airport map 116) to and/or from other devices via a network such as the Internet. For example, communication subsystem 810 can be used receive or send data to another computing system. As another example, communication subsystem may be used to communicate with other computing systems during execution of method 700 in a distributed computing environment.

Further, the disclosure comprises configurations according to the following clauses.

Clause 1. A computing device, comprising: a processor; and a memory storing instructions executable by the processor to: query a database of aviation information extracted from one or more aviation information notices for information regarding a status of an airport; receive one or more query results indicating a status of a taxiway of the airport; and use the one or more query results to generate a map of the airport depicting the taxiway with a graphical representation that indicates the status of the taxiway.

Clause 2. The computing device of clause 1, wherein the status comprises a closure, and wherein the graphical representation represents at least a portion of the taxiway subject to the closure.

Clause 3. The computing device of clause 2, wherein the status comprises a partial closure, and further comprising a different graphical representation that indicates a portion of the taxiway that is not closed.

Clause 4. The computing device of clause 1, wherein the status comprises a conditional closure, and wherein the graphical representation comprises an indication of the conditional closure.

Clause 5. The computing device of clause 4, wherein the indication of the conditional closure comprises an interactive control selectable to cause display of information on the conditional closure.

Clause 6. The computing device of clause 4, wherein the graphical representation further comprises information on the conditional closure.

Clause 7. The computing device of clause 1, wherein the graphical representation comprises one or more of a different color, a different opacity, or a different texture than another portion of the map.

Clause 8. The computing device of clause 1, wherein the taxiway comprises a turn, and wherein the instructions are further executable to depict a centerline of the turn as having the graphical representation that indicates the status.

Clause 9. Enacted on a computing device, a method for graphically depicting a status of a taxiway for an airport, the method comprising: querying a database of aviation information for information regarding a status of an airport; receiving one or more query results indicating a status of a taxiway of the airport; and using the one or more query results to generate a map of the airport depicting the taxiway with a graphical representation that indicates the status of the taxiway.

Clause 10. The method of clause 9, further comprising determining that the status comprises a closure, and wherein depicting the taxiway comprises representing at least a portion of the taxiway subject to the closure.

Clause 11. The method of clause 10, wherein the status comprises a partial closure, and wherein generating the map further comprises depicting a portion of the taxiway that is not closed with a different graphical representation.

Clause 12. The method of clause 9, further comprising determining that the status comprises a conditional closure, and wherein depicting the taxiway comprises providing an indication of the conditional closure.

Clause 13. The method of clause 12, wherein providing the indication of the conditional closure comprises providing an interactive control selectable to cause display of information on the conditional closure.

Clause 14. The method of clause 12, wherein providing the indication of the conditional closure further comprises depicting textual information on the conditional closure.

Clause 15. The method of clause 9, wherein the graphical representation comprises one or more of a different color, a different opacity, or a different texture than another portion of the map.

Clause 16. The method of clause 9, wherein the taxiway comprises a turn, and further comprising depicting a centerline of the turn as having the graphical representation that indicates the status.

Clause 17. A computing device, comprising: a processor; and a memory storing instructions executable by the processor to: query a database of aviation information for information regarding a status of an airport; receive one or more query results indicating a status of a taxiway of the airport; use the one or more query results to generate a map of the airport depicting the taxiway with a graphical representation that indicates the status of the taxiway; determine that the status of the taxiway comprises a partial closure; depict at least a portion of the taxiway that is closed with the graphical representation; and depict a portion of the taxiway that is not closed with a different graphical representation.

Clause 18. The computing device of clause 17, wherein the status comprises a conditional closure, and wherein the graphical representation comprises an indication of the conditional closure.

Clause 19. The computing device of clause 18, wherein the indication of the conditional closure comprises an interactive control selectable to cause display of information on the conditional closure.

Clause 20. The computing device of clause 17, wherein the graphical representation comprises one or more of a different color, a different opacity, or a different texture than another portion of the map.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor; and
a memory storing instructions executable by the processor to:
query a database of aviation information extracted from one or more aviation information notices for information regarding a status of an airport;
receive one or more query results indicating a status of a taxiway of the airport; and
use the one or more query results to generate a map of the airport depicting the taxiway with a graphical representation that indicates the status of the taxiway;
determine that the taxiway comprises one or more of a turn or another taxiway element;
based on determining that the taxiway comprises the turn, depict a centerline of the turn as having a centerline graphical representation, wherein the centerline graphical representation indicates that the turn is closed, and wherein the centerline graphical representation comprises a different graphical fill representation than the taxiway in the turn; and
based on determining that the taxiway comprises another taxiway element, depict the other taxiway element as having a graphical fill representation that indicates a status of the other taxiway element.

2. The computing device of claim 1, wherein the status comprises a closure, and wherein the graphical representation represents at least a portion of the taxiway subject to the closure.

3. The computing device of claim 2, wherein the status comprises a partial closure, and further comprising a different graphical representation that indicates a portion of the taxiway that is not closed.

4. The computing device of claim 1, wherein the status comprises a conditional closure, and wherein the graphical representation comprises an indication of the conditional closure.

5. The computing device of claim 4, wherein the indication of the conditional closure comprises an interactive control selectable to cause display of information on the conditional closure.

6. The computing device of claim 4, wherein the graphical representation further comprises information on the conditional closure.

7. The computing device of claim 1, wherein the graphical representation comprises one or more of a different color, a different opacity, or a different texture than another portion of the map.

8. Enacted on a computing device, a method for graphically depicting a status of a taxiway for an airport, the method comprising:
querying a database of aviation information for information regarding a status of an airport;
receiving one or more query results indicating a status of a taxiway of the airport; and
using the one or more query results to generate a map of the airport depicting the taxiway with a graphical representation that indicates the status of the taxiway;
determining that the taxiway comprises one or more of a turn or another taxiway element;
based on determining that the taxiway comprises the turn, depicting a centerline of the turn as having a centerline graphical representation, wherein the centerline graphical representation indicates that the turn is closed, and wherein the centerline graphical representation comprises a different graphical fill representation than the taxiway in the turn; and
based on determining that the taxiway comprises another taxiway element, depicting the other taxiway element as having a graphical fill representation that indicates a status of the other taxiway element.

9. The method of claim 8, further comprising determining that the status comprises a closure, and wherein depicting the taxiway comprises representing at least a portion of the taxiway subject to the closure.

10. The method of claim 9, wherein the status comprises a partial closure, and wherein generating the map further comprises depicting a portion of the taxiway that is not closed with a different graphical representation.

11. The method of claim 8, further comprising determining that the status comprises a conditional closure, and wherein depicting the taxiway comprises providing an indication of the conditional closure.

12. The method of claim 11, wherein providing the indication of the conditional closure comprises providing an interactive control selectable to cause display of information on the conditional closure.

13. The method of claim 11, wherein providing the indication of the conditional closure further comprises depicting textual information on the conditional closure.

14. The method of claim 8, wherein the graphical representation comprises one or more of a different color, a different opacity, or a different texture than another portion of the map.

15. A computing device, comprising:
a processor; and
a memory storing instructions executable by the processor to:
query a database of aviation information for information regarding a status of an airport;
receive one or more query results indicating a status of a taxiway of the airport;
use the one or more query results to generate a map of the airport depicting the taxiway with a graphical representation that indicates the status of the taxiway;
determine that the taxiway comprises one or more of a turn or another taxiway element;
based on determining that the taxiway comprises the turn, depict a centerline of the turn as having a centerline graphical representation, wherein the centerline graphical representation indicates that the turn is closed, and wherein the centerline graphical representation comprises a different graphical fill representation than the taxiway in the turn;
based on determining that the taxiway comprises another taxiway element, depict the other taxiway element as having a graphical fill representation that indicates a status of the other taxiway element;
determine that the status of the taxiway comprises a partial closure;
depict at least a portion of the taxiway that is closed with the graphical representation, wherein the graphical representation represents at least the portion of the taxiway subject to the closure; and
depict a portion of the taxiway that is not closed with a different graphical representation.

16. The computing device of claim 15, wherein the status comprises a conditional closure, and wherein the graphical representation comprises an indication of the conditional closure.

17. The computing device of claim 16, wherein the indication of the conditional closure comprises an interactive control selectable to cause display of information on the conditional closure.

18. The computing device of claim 16, wherein the graphical representation further comprises information on the conditional closure.

19. The computing device of claim 15, wherein the graphical representation comprises one or more of a different color, a different opacity, or a different texture than another portion of the map.

20. The computing device of claim 15, wherein the taxiway is subject to a scheduled closure, and wherein the graphical representation indicates that the taxiway is subject to the scheduled closure.

* * * * *